No. 742,187.                                   Patented October 27, 1903.

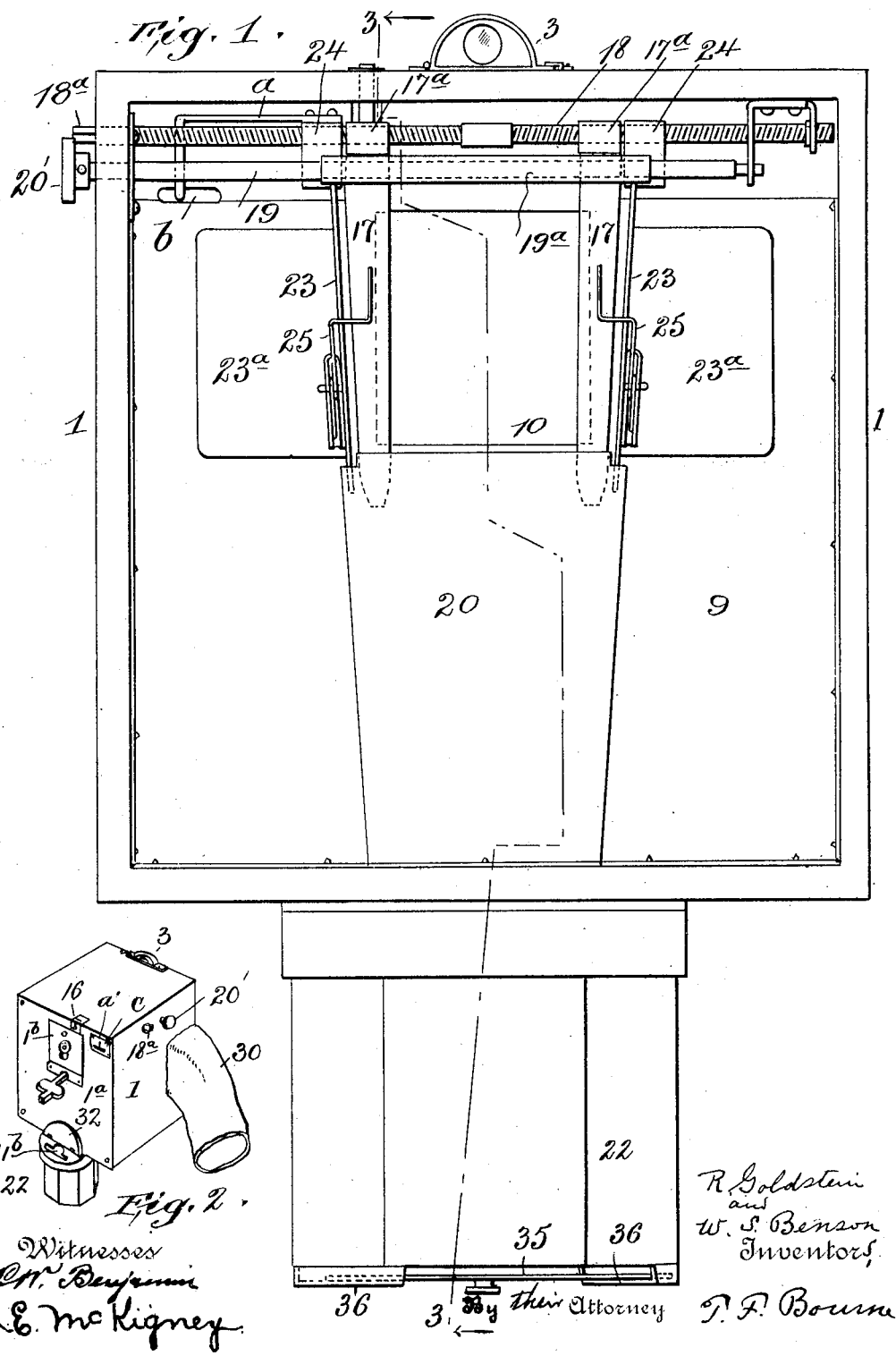

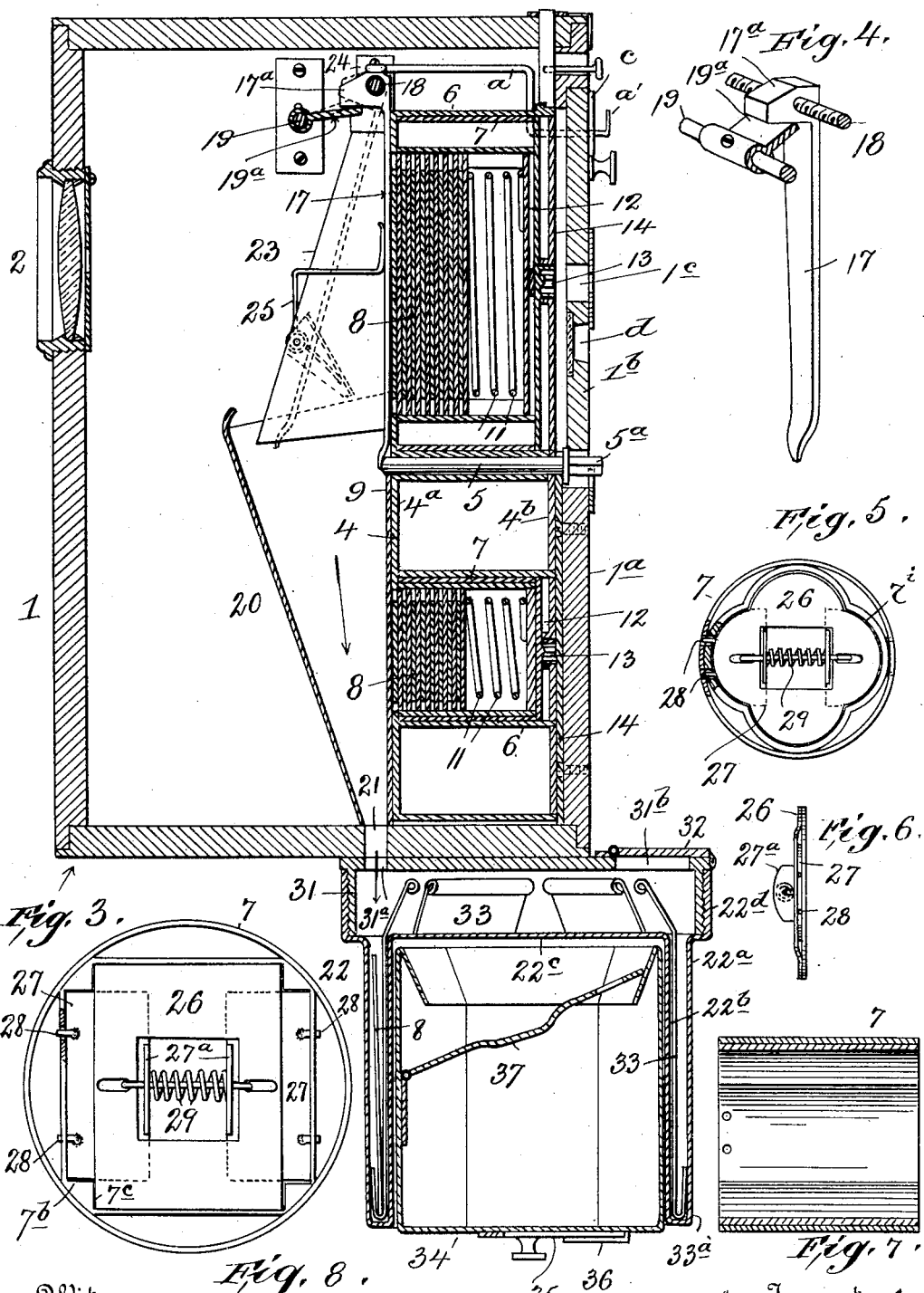

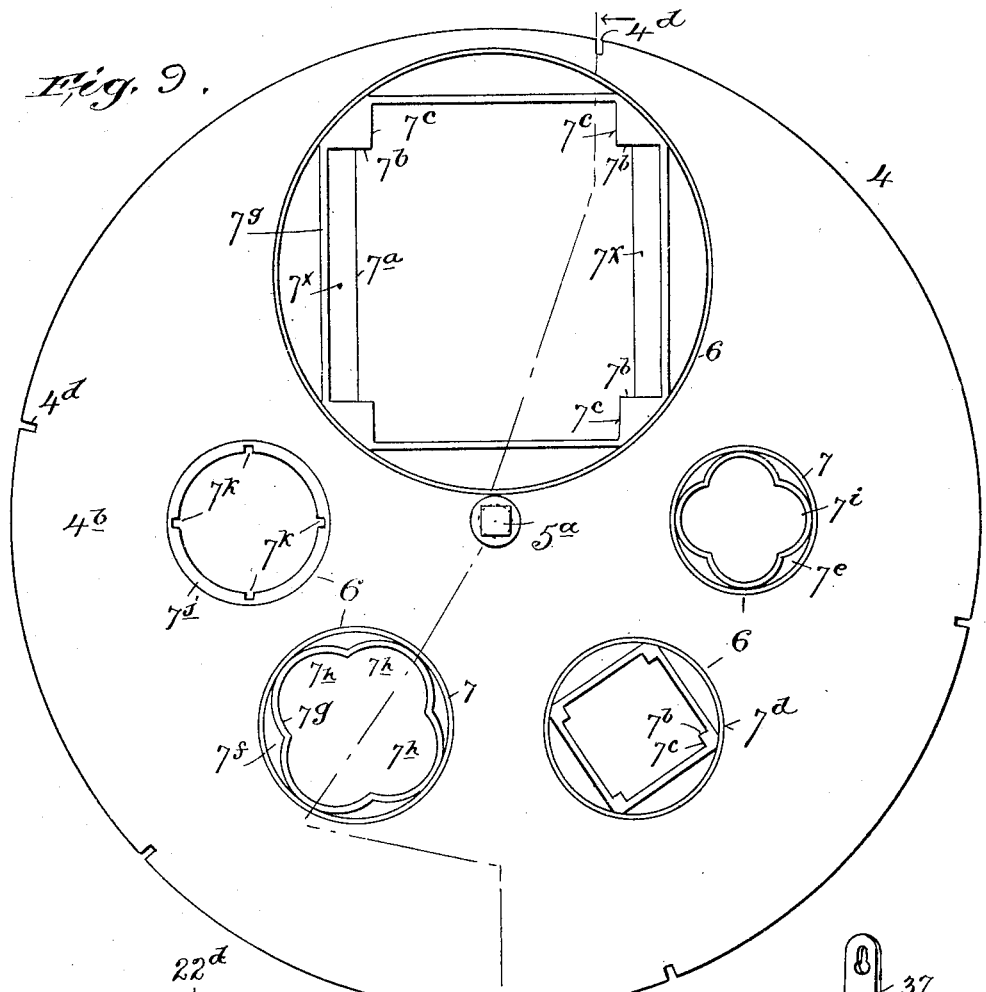

UNITED STATES PATENT OFFICE.

ROBERT GOLDSTEIN AND WILLIAM S. BENSON, OF NEW YORK, N. Y.

PHOTOGRAPHIC APPARATUS.

SPECIFICATION forming part of Letters Patent No. 742,187, dated October 27, 1903.

Application filed May 6, 1903. Serial No. 155,854. (No model.)

*To all whom it may concern:*

Be it known that we, ROBERT GOLDSTEIN and WILLIAM S. BENSON, residents of New York city, borough of Manhattan, New York, have invented certain new and useful Improvements in Photographic Apparatus, of which the following is a specification.

Our invention relates more particularly to an apparatus or camera to be used in producing the class of pictures commonly called "tintypes;" and the invention has for its object to provide an apparatus of such character wherein a plurality of sensitized plates for pictures may be arranged in a bunch or in magazine form to permit exposure of the plates successively and wherein the plates after exposure may be readily passed into a bath consisting of a single solution adapted to develop and fix the picture, all without removing the plate from the machine, whereby a finished tintype or picture may be quickly and readily made without exposure to light and without handling. While one picture is being developed and fixed in said bath another picture can be exposed, and so on successively. In accordance with our invention we also provide means for maintaining in the apparatus a plurality of bunches of plates for pictures of varying sizes and shapes whereby either set of plates may be readily brought in line with the lens for exposure for producing a picture. By such means the camera can be charged with a large number of plates of varying shapes and dimensions, whereby a portable camera capable of being used outdoors for producing tintypes and developing the same without the use of a dark room is provided.

The invention also contemplates the novel details of improvement and combinations of parts, that will be more fully hereinafter set forth and then pointed out in the claims.

Reference is to be had to the accompanying drawings, forming part hereof, wherein—

Figure 1 is a front elevation of a photographic apparatus or camera embodying our invention, the front wall being removed. Fig. 2 is a perspective view, on a reduced scale, of the apparatus ready for use. Fig. 3 is a vertical section thereof, substantially on the line 3 3 in Fig. 1, looking in the direction of the arrows. Fig. 4 is a perspective view in detail of part of the means for maintaining the sensitized plate in position for exposure and for releasing the plate. Fig. 5 is an end view of one of the holders or magazines for sensitized plates shown provided with a removable cover to protect the plates while being inserted in the apparatus. Fig. 6 is an edge view of such cover. Fig. 7 is a central section through the plate-holder. Fig. 8 is a view corresponding to Fig. 5, but showing a holder or magazine capable of holding different-shaped plates. Fig. 9 is an enlarged detail face view of the main drum adapted to support the various-sized plate-holders. Fig. 10 is a plan view of the tank or bath-receptacle shown in section in Fig. 3. Fig. 11 is a perspective view of the removable water or liquid receptacle carried by said tank, and Fig. 12 is a perspective view of a device for removing plates from the bath.

Similar characters of reference indicate corresponding parts in the several views.

In the drawings, the numeral 1 indicates the main casing or frame of the apparatus, which may be of suitable construction and provided with a lens 2 of any suitable kind, and at 3 is indicated a range-finder. Within frame 1 is rotatively supported a drum 4, which may be of suitable construction, and said drum is shown carried by a shaft 5, suitably journaled in frame 1 and secured to said drum, so that the latter may be rotated by means of a key placed upon the squared end $5^a$ of said shaft or in other suitable manner, the end of the shaft being shown passing through an aperture in the back wall $1^a$ of the frame. The drum 4 is provided with a number of pockets or bearings 6, which may be in the form of tubes or annular walls suitably secured between the end walls $4^a$ $4^b$ of the drum and opening therethrough. Within the bearings or pockets 6 are rotatively supported plate-holders 7, which are shown in tubular form and provided on the interior with means for supporting sensitized plates 8 in series or bunches placed on edge, and the arrangement is such that the axes of the plate-holders may be brought in line with the axis of the focus-point of the lens 2 when the drum 4 is rotated or, in other words, so that the axes of the plate-holders will lie in a circle described around the axis of shaft 5.

At 9 is indicated a plate or shield within frame 1, lying in front of the drum 4 to prevent light from reaching the plates 8, and in line with the lens 2 the plate 9 is removed or cut away, leaving an opening, as at 10, Fig. 1, for the light to strike through to reach the foremost plate in line with the lens. The plates 8 are normally kept pressed forward by means of a spring 11, bearing at one end against a plate or a follower and at the opposite end against a head 12, removably secured to the corresponding plate-holder 7, so as to rotate therewith. The head 12 is shown provided with an angular stem 13, adapted to be operated by a key for rotating the plate-holder in its bearing 6.

At 14 is indicated a plate adapted to be removably secured to the drum 4 in line with the corresponding plate-holder 7, the latter being mounted to rotate between the front wall $4^a$ of the drum and the wall 14. The wall 14 is provided with an aperture alined with the stem 13, and the back $1^a$ of frame 1 is shown provided with a removable portion or cover $1^b$, having an aperture $1^c$, in line with which the stems 13 are adapted to come to permit the passage of a key for rotating either plate-holder. Said plate-holders and the means of supporting them upon drum 4 are all substantially of the same general construction excepting that, as shown in the drawings, said plate-holders are of varying sizes and adapted to contain plates of different sizes and shapes, as more clearly shown in Fig. 9. The large plate-holder indicated at $7^a$ is adapted to contain rectangular sensitized plates, and in all cases the plates of a series or bunch are placed successively at right angles to each other or crosswise, so that each second plate will extend in one direction and the intermediate plate in another direction, whereby the corresponding ends or sides of contiguous plates will respectively project beyond the others. To accommodate this arrangement of plates, which is indicated in the section in Fig. 3, the plate-holder indicated at $7^a$ has a shell $7^g$, provided with ledges $7^b$, that are at right angles to ledges $7^c$, and a similar arrangement is shown with respect to the plate-holder indicated at $7^d$ on a smaller scale to accommodate smaller plates. The plate-holders indicated at $7^e$ and $7^f$ are adapted to contain oval plates, which also are to be arranged at right angles to each other, as above described, and to properly hold such oval plates the plate-holder is provided with an inner shell $7^g$, having opposed concave portions $7^h$, forming ledges, the plate-holder indicated at $7^i$ being similarly arranged, but for smaller-sized plates. Thus each oval plate may be arranged at right angles to the next adjacent plate. The plate-holder indicated at $7^f$ is adapted for holding circular sensitized plates, and to properly maintain such plates said holder is provided with inner opposed grooves $7^k$, adapted to receive lugs projecting from the sensitized plates, there being two lugs on diametrically opposite sides of each plate, whereby the lugs of each plate may be placed in such grooves and arranged at right angles to the next adjacent plate. By means of the arrangements described the sensitized plates are held from independent rotation within the rotative plate-holders and are adapted to be rotated by and with the plate-holders.

The openings in the wall $4^a$ of the drum that aline with the corresponding plate-holders are so disposed that their greatest dimension or length will be vertical when the plate-holder is in line with the lens, the narrowest dimension of such opening being then horizontally disposed, presenting abutments at the front, as indicated at $7^x$ in Fig. 9, against which abutments the horizontally-disposed forward plate at its edges will bear to prevent the bunch of plates from being pushed through the plate-holder and its front opening in the wall $4^a$ and whereby the forward vertically-disposed sensitized plate may pass through said opening at the proper time.

Means are provided for holding the drum 4 firmly in such position that either of the plate-holders will aline with lens 2, and for this purpose we have shown the drum 4 provided with notches $4^d$, corresponding to the plate-holders and adapted to receive a latch or the like 16, suitably carried by frame 1 and adapted to be released to permit the drum to rotate. (See Fig. 3.) The foremost sensitized plates in all the plate-holders, excepting the one that is alined with the lens 2, are kept from being pushed from the plate-holder by means of the plate 9, and to maintain the foremost sensitized plate of the plate-holder that is alined with the lens in proper position while the picture is being photographed and to permit said plate to be dropped from the holder after exposure we provide the following arrangements, which are adapted for operation with the various-sized sensitized plates, viz: The opening 10, through which the exposure is made, is of sufficient dimensions to permit the largest sensitized plate when standing vertically to pass through, and at opposite sides of such opening arms or fingers 17 are placed. (See Fig. 1.) These arms are adjustable toward and from each other and are so arranged that they may be brought in line with the narrow edges of the foremost plate, which in the case of all but the circular plates stand vertically for photographing. Said arms thereby maintain the foremost plate in photographing position. In the case of the circular plates having the lugs, as at $7^j$, the corresponding front opening or wall $4^a$ is sufficiently small to permit horizontally-disposed lugs to engage it, while notches are cut above and below in vertical line to aline with the vertically-disposed notches $7^k$ of the plate-holder $7^j$, whereby the foremost plate can pass through the opening; but the next rearmost plate having its lugs extending horizontally is prevented by the wall $4^a$ from being pushed through. To support and operate the arms or fingers 17, we have shown a worm-shaft 18, having right and left threads, upon which the arms 17 are mounted, and the head portions 17$^a$ of said arms are respectively provided with internal threads to mesh with said right and left worms. The shaft 18 is journaled in suitable bearings in frame 1, and when rotated in one or the other direction will cause the arms 17 to approach each other or move away from each other, as the case may be. The shaft 18 may have a squared portion 18$^a$ to receive a key for operating it. Thus if the largest picture is to be taken the arms 17 are adjusted outwardly, so that they will lie in front of the extreme side of the foremost sensitized plate, and if the smallest picture is to be taken the arms 17 will be adjusted toward each other the proper distance to lie in front of the extreme side edges of such plate, and likewise said arms are properly adjusted to lie in front of the extreme side edges of plates of intermediate size. Means are provided for moving the arms 17 outwardly, as indicated in the dotted position in Fig. 3, to release the foremost sensitized plate after exposure, and to this end we have shown a shaft 19, journaled in suitable bearings in frame 1 and provided with a handle 20, and said shaft has an extension 19$^a$, adapted to lie under lugs or projections 17$^a$ of arm 17, the extension 19$^a$ being of sufficient length to lie under the projection 17$^a$ of both arms when the latter are in their extreme outward position, the projections sliding along the extension 19$^a$ when the arms are adjusted. By rocking the shaft 19 the arms 17 in whichever position they may be will be swung outwardly to permit the sensitized plate to drop, and thereupon the next rearmost horizontal plate will be held by wall 4$^a$ from being pushed outwardly. To indicate when the arms 17 have been properly adjusted to correspond with either of the plate-holders, we provide an indicator, which is shown in the form of an arm $a$, attached to one of the arms 17 and having a portion passing through a slot $b$ in the frame and provided with a finger or pointer $a'$, adapted to travel across a scale $c$ on the frame, Fig. 2.

At $d$ is indicated a sight-hole in the cover 1$^b$, through which may be seen figures or the like upon plate 14, which indicate the corresponding plate-holder. By the above means when the drum is turned to bring the desired plate-holder in line with the lens, which can be ascertained by looking through the sight-hole $d$, the arms 17 will also be adjusted to correspond to position of such plate-holder, and by means of pointer $a'$ and the scale $c$ it can be readily determined when the arms 17 are in proper position.

Each time a plate is to be exposed the drum is adjusted to bring the desired plate-holder in line with the lens, and then the plate-holder is rotated on its axis until the foremost plate stands vertically, so that it may pass through the front opening, and the next rearmost plate stands horizontally, and each time that a plate is exposed and dropped below the plate-holder must be given at least a quarter-turn to bring the foremost plate to the vertical position, so that the next rearmost plate will be horizontal, and so on throughout the bunch of plates. By this means the foremost plate of a bunch may always be brought to the position for exposure, while the rest of the bunch of plates is kept within its holder.

The plates after exposure are dropped into a chute, (shown at 20,) the lower end of which leads to an opening 21 in the bottom of the frame through which the plates pass into a tank or bath 22, containing a solution for developing and fixing the pictures. Above chute 20 and at the sides of the arms 17 are shields 23 to assist in guiding the plates into the chute, and said shields are preferably made adjustable laterally coincidently with the arms 17. To this end the shields 23 have heads 24, provided with internal threads that mesh with the worm-threads of shaft 18, whereby as the arms 17 are adjusted laterally the shields are correspondingly adjusted. The shields 23 are shown provided with laterally-disposed wings 23$^a$, lying against wall 9 and serving to prevent light from striking sensitized plates in the adjacent plate-holders. Springs 25 (shown carried by the shields 23) bear against the arms 17 and keep the arms normally pressed toward plate 9, and the outer ends of said shields may bear against the chute 20 to keep the shields against plate 9 and to permit springs 25 to act properly against arms 17.

In order to permit plate-holders that have been charged with sensitized plates to be applied to drum 4 without the necessity of taking the apparatus into a dark room, we provide covers for the open ends of the plate-holders, which are adapted to be removed after the plate-holders are placed in the drum. Arrangements for this purpose are shown in Figs. 5, 6, and 8. To this end a cover 26 of such shape as to properly fit in the plate-holder is provided with wings 27, having pins 28, that are adapted to enter holes in the plate-holder, and said wings have thumb-pieces 27$^a$, projecting outwardly from plate 26, a spring 29, interposed between said thumb-pieces, serving normally to press the pins outwardly. The arrangement is such that the plate-holders may be charged and the spring and cover 11 applied in a dark room, and when the plate-holders are exposed to the light the sensitized plates will not be injured, and then when a plate-holder of the drum 4 is empty and another charged plate-holder is to be applied the door 1$^b$ is removed, the empty plate-holder withdrawn, and a charged plate-holder inserted with the plate 26 projecting toward the lens. The operator may then pass his arm through an opening in the frame, which may be protected by a sleeve 30, and by grasping the thumb-pieces 27ª and pressing them together the pins 28 will be withdrawn from the plate-holder and the plate 26 can be removed, exposing the foremost sensitized plate.

One of the main features of our invention consists in the arrangement whereby the plates after exposure may be developed and fixed without removal from the apparatus, and to this end we utilize a single solution capable of developing and fixing the pictures and which is carried in the tank 22. The tank 22 we have shown comprises an outer wall 22ª and an inner wall 22ᵇ, forming a space therebetween to receive the plates 8, said walls being joined at the bottom and a plate or cover 22ᶜ being connected to the top of the walls 22ᵇ. The tank is shown of angular form, providing angular spaces or pockets in communication with each other to receive the plates 8 and the solution, and the upper rim 22ᵈ of the tank is shown as circular and provided with screw-threads engaging corresponding threads on a cover 31, that is secured to the bottom of frame 1 and provided with an aperture 31ª, alined with the aperture 21 of the frame. (See Fig. 3.) The tank 22 can thus be rotated on its threads to bring the various angular pockets or spaces beneath openings 21 and 31ª to receive plates 8, that drop through chute 20. At the side of cover 31, opposite the opening 31ª and projecting beyond frame 1, the cover is provided with an opening 31ᵇ, through which plates after being developed and fixed are withdrawn, and at 32 is indicated a lid to close said opening. (See Figs. 2 and 3.) To conveniently permit the finished plates 8 to be removed from the tank, we provide lifters 33, shown in the form of strips having hooked ends 33ª, adapted to extend into the pockets of the tank and to receive the plates 8, as in Fig. 3. When a plate has dropped into the tank, it falls into the lifter 33, and after a suitable time the plate can be removed by raising the lifter through opening 31ᵇ, the tank having been rotated to bring the plate under said opening. The arrangement of the tank is such as to permit a receptacle 34 for water to be placed within the space bound by the walls 22ᵇ, a suitable clip or tongue 35 on the bottom of the receptacle 34 serving to engage a hook 36 on the bottom of the tank to hold the receptacle in place.

At 37 is indicated a handle pivotally carried by the receptacle 34 to permit the same to be hung from frame 1, whereby the pictures may be readily washed.

By means of our improved apparatus it will be observed that the sensitized plates may be carried in the apparatus in the nature of a magazine, and the apparatus can be readily used in the open air where a dark room is not convenient, because the sensitized plates are all concealed from light, and when a picture is to be taken it is merely necessary to rotate the drum and bring the desired plate 8 in line with the lens, to then adjust the corresponding plate-holder so that the foremost plate will stand vertically or in the proper position, and then after exposure of the plate the arms 17 are operated to permit the plate to drop through the chute into the tank. While that plate remains in the tank another exposure can be made, the tank having been partly rotated, and so on, and pictures can be taken rapidly and successfully, and by the time the first plate has been brought under the opening 31ᵇ the solution will have developed and fixed the picture and the plate can be readily removed from the tank. The advantages of our improvements as applied to the class of pictures commonly called "tintypes" will be obvious, as it will be understood that a dark room is not needed, and therefore pictures can be produced and developed in the open air, and the operation is further simplified because of the use of a single solution adapted to develop and fix the pictures, whereby the necessity of handling the plates and utilizing several solutions is dispensed with.

It will be obvious that our improved apparatus may be used in magazine form with a single plate-holder adapted to hold a bunch or series of plates in the manner set forth, where the support for the plate-holder is made stationary and the holder adapted to rotate or rock to present the various plates for exposure.

Various modifications may be made in the details and arrangements shown and described without departing from the spirit of our invention.

Having now described our invention, what we claim is—

1. A photographic apparatus comprising a casing, a plate-holder therein adapted to contain a series of plates, means for permitting the foremost plate to be exposed and removed while maintaining the other plates in the series in the holder, a tank to contain a single solution adapted to develop and fix pictures on the plates, a cover for the tank provided with an opening, and means for supporting the tank so that it may be turned from the plate-receiving position to bring plates under the opening to permit their removal from the tank, substantially as described.

2. A photographic apparatus comprising a casing, a plate-holder adapted to receive a series of plates, means to permit the foremost plate to be removed after exposure while the remaining plates are maintained in the holder, said casing having an opening for the passage of plates, a tank alined with said opening and adapted to contain a single solution serving to develop and fix the plates, said tank having a cover provided with an opening for the removal of the plates from the tank and located at a distance from the opening through which the plates enter the tank, and means to support the tank so that it may be turned to carry the plates from the receiving to the delivery position, substantially as described.

3. A photographic apparatus comprising a casing, a plate-holder adapted to contain a series of plates, means for supporting said plate-holder so that it may be turned on its axis, means to permit the plates to be dropped from the plate-holder when held in one position and to prevent the plates from dropping therefrom when the plates are in another position, and a tank to receive the plates after exposure, substantially as described.

4. A photographic apparatus comprising a casing, a plate-holder adapted to contain a series of plates, a bearing to support the plate-holder so that it may turn on its axis, an abutment at the delivery end of the plate-holder against which the edge of a plate may bear when turned in one position, means to resist the movement of the plate when turned in a different position, and means to permit removal of the plate after exposure, substantially as described.

5. A photographic apparatus comprising a casing, a plate-holder adapted to contain a series of plates, a bearing to support the plate-holder so that it may turn on its axis, an abutment at the delivery end of the plate-holder against which the edge of a plate may bear when turned in one position, arms adapted to lie in front of the foremost plate to hold it in position for exposure, and means to permit said arms to be moved to release said plate, substantially as described.

6. A photographic apparatus comprising a drum, a series of plate-holders movably carried in bearings in said drum, means to prevent the passage of plates from the holders when the plates are in one position, and means to hold the foremost plate in position for exposure and to release said plate after exposure, substantially as described.

7. A photographic apparatus comprising a casing, a drum rotatively supported therein, a series of plate-holders of various sizes and shapes rotatively supported by said drum, means to maintain a series of plates in each of said holders when the plates are in one position, movable arms or fingers adapted to prevent the removal of the foremost plate of a series, means for adjusting said fingers or arms laterally with respect to said holders, and means for operating said fingers or arms to permit the foremost plate of a holder to be removed therefrom, substantially as described.

8. A photographic apparatus comprising a casing, a drum provided with bearings, a series of plate-holders mounted in said bearings, abutments at the forward ends of said plate-holders to resist the passage of plates when held in one position, fingers or arms to resist the passage of plates when held in another position, means for adjusting said fingers or arms laterally to accommodate sensitized plates of different sizes, and means for moving said arms away from the plate to release the latter, substantially as described.

9. A photographic apparatus comprising a frame, a drum mounted therein and provided with bearings, a plurality of plate-holders of various sizes adapted to contain plates of different sizes and shapes, abutments for plates at the delivery ends of said bearings, fingers or arms located in front of said drum adapted to resist the passage of plates from the holders, means for adjusting said fingers or arms laterally, means for indicating the position of adjustment of said fingers or arms, and means for moving said fingers or arms to release the exposed plate, substantially as described.

10. A photographic apparatus comprising a casing, a drum mounted therein and provided with bearings, plate-holders mounted in said bearings, abutments at the delivery ends of said plate-holders, fingers or arms in front of the drum, a threaded shaft adapted to move said arms laterally, a shaft having an extension adapted to coact with said arms to operate them, and a tank adapted to receive plates when released by the fingers or arms, substantially as described.

11. A photographic apparatus comprising a casing, a drum mounted therein and provided with bearings, plate-holders mounted in said bearings, abutments at the delivery ends of said plate-holders, fingers or arms in front of the drum, a threaded shaft adapted to move said arms laterally, a shaft having an extension adapted to coact with said arms to operate them, a pointer connected with one of said arms adapted to indicate the position of the arms, and a tank adapted to receive plates when released by the fingers or arms, substantially as described.

12. A photographic apparatus comprising a casing, a drum mounted therein and provided with a bearing, a plate-holder mounted to turn in said bearing, said plate-holder being provided with a removable head having a stem to receive a key, an abutment at the opposite end of the plate-holder to resist the passage of plates when turned in one direction, and means to hold the foremost plate when turned in another direction, substantially as described.

13. A photographic apparatus comprising a casing, a drum mounted therein and provided with bearings, plate-holders mounted to turn in said bearings, abutments at the forward ends of said plate-holders, arms or fingers adapted to lie in front of said plate-holders, shields at the sides of said arms, wings projecting from said shields, means for supporting and operating said fingers or arms and said shields or wings, a chute beneath said shields, and a tank beneath the chute adapted to contain a solution and to receive plates when dropped from said holder, substantially as described.

14. A plate-holder comprising an annular body provided with a shell having ledges adapted to maintain series of plates so that they may be held at right angles to each other or crosswise respectively, substantially as described.

15. A plate-holder comprising a body provided with an inner shell having opposed concave surfaces, two of which surfaces are at right angles to two other similar surfaces, whereby oval-shaped plates may be maintained in the holder at right angles to each other, substantially as described.

16. A plate-holder comprising a body adapted to contain a series of plates, a cover adapted to conceal the plates, and means for removably supporting the cover upon the holder, substantially as described.

17. A plate-holder comprising a body adapted to contain plates and having a cover provided with wings having thumb-pieces, and projections carried by said thumb-pieces adapted to enter holes in the holder, whereby the cover may be held upon and readily removed from the holder, substantially as described.

ROBERT GOLDSTEIN.
WILLIAM S. BENSON.

Witnesses:
T. F. BOURNE,
I. E. McKIGNEY.